United States Patent [19]

Allen

[11] 3,972,245
[45] Aug. 3, 1976

[54] BICYCLE FREEWHEEL

[75] Inventor: John Michael Allen, Southwell, England

[73] Assignee: Raleigh Industries Limited, Nottingham, England

[22] Filed: Aug. 20, 1974

[21] Appl. No.: 499,067

[52] U.S. Cl. ............................ 74/243 R; 74/217 B; 192/64
[51] Int. Cl.² ................... F16H 11/04; F16D 41/18; F16H 7/10
[58] Field of Search .................. 74/217 B, 242.15 B, 74/243 R, 243 DR, 217 S; 308/192; 192/64, 46

[56] References Cited

UNITED STATES PATENTS

| 3,492,883 | 2/1970 | Maeda | 74/217 B |
|---|---|---|---|
| 3,554,340 | 1/1971 | Shimano | 192/64 |
| 3,648,519 | 3/1972 | Nakata et al. | 74/217 B |
| 3,661,021 | 5/1972 | Ohshita | 74/217 B |

FOREIGN PATENTS OR APPLICATIONS

| 89,253 | 3/1937 | Denmark | 74/217 B |
|---|---|---|---|
| 59,338 | 5/1954 | France | 74/217 B |
| 453,460 | 11/1945 | Italy | 74/217 B |

*Primary Examiner*—Benjamin W. Wyche
*Assistant Examiner*—A. Russell Burke
*Attorney, Agent, or Firm*—Lilling & Siegel

[57] ABSTRACT

There is disclosed a Derailleur block comprising a sleeve adapted to be secured to a bicycle wheel hub, a sprocket carrier mounted on the sleeve with interposed ball races and free wheeling mechanism, and a number of sprockets having different numbers of teeth secured in axially spaced relationship on the carrier. At one end of the block there is a cone for adjusting the ball-race clearances in co-axial screw threaded engagement in the carrier, and in screw-threaded engagement with the protruding end of the cone, there is a lock nut. The lock nut serves not only to secure the cone after adjustment, but as an abutment for the sprocket assembly which is thereby readily removable. Both cone and lock nut are accessible for manipulation externally of the block.

3 Claims, 2 Drawing Figures

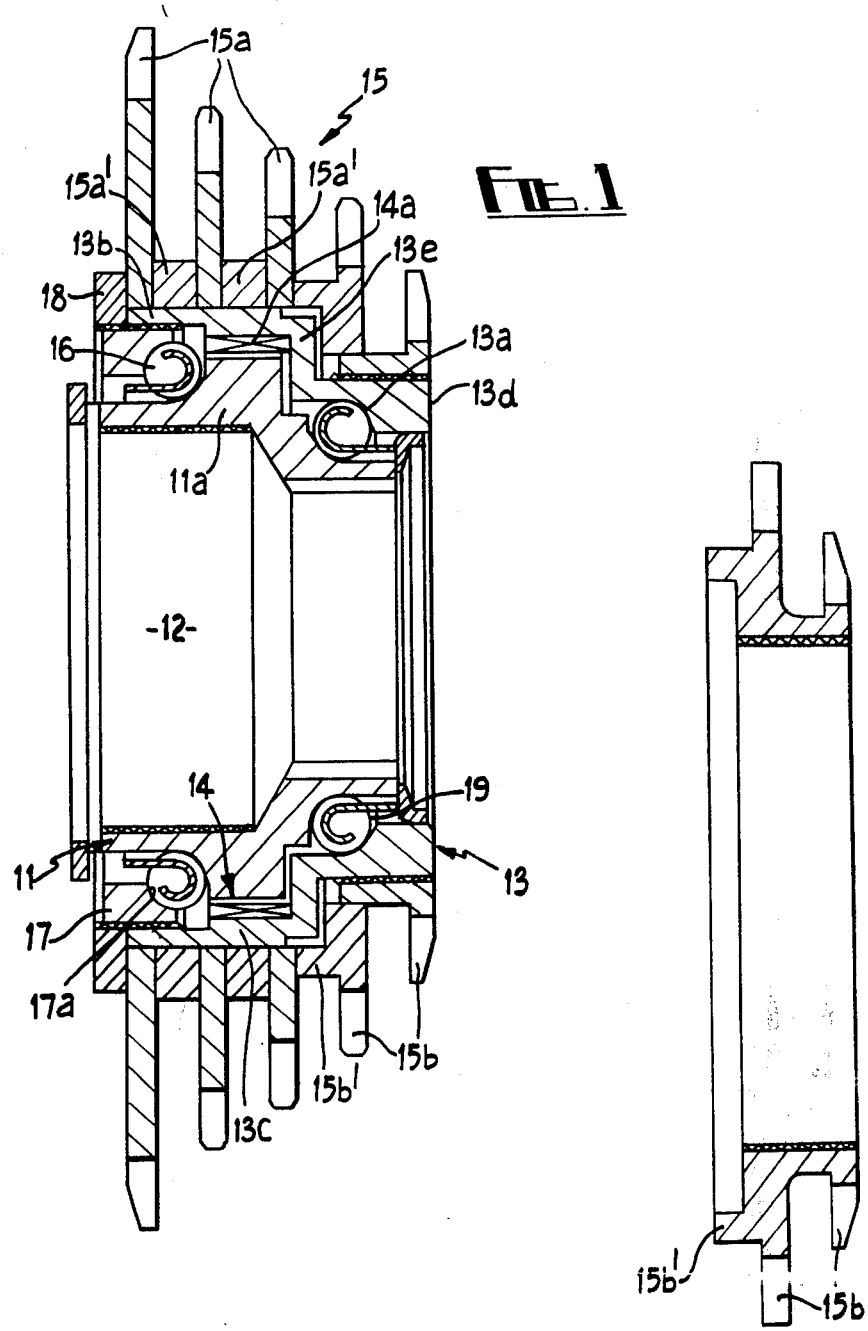

BICYCLE FREEWHEEL

This invention concerns gearing arrangements for pedally propelled vehicles such as bicycles, more particularly, Derailleur-type gearing arrangements for such vehicles.

The provision of Derailleur-type gears on, say, a bicycle involves the provision of a number of sprockets, each having a different number of teeth, on the driven rear wheel and adapted to be selectively engaged by the driving chain according to the gearing required. Usually the sprocket assembly is associated with the wheel hub through a free-wheeling mechanism. The assembly consisting of sprockets, free-wheeling mechanism and means for securing to the wheel is commonly referred to as a Derailleur block, and will be so referred to in this specification and the claiming clauses thereof.

Known Derailleur blocks have the usual adjustable "cones" for setting the clearance of ball-race means forming part of the free-wheeling mechanism, and the setting is achieved by using shims within the assembly. This means that the block must in effect be dismantled in order to change the setting. Furthermore in order to replace or change the sprockets it is necessary to disturb the free-wheel mechanism.

The term "cone" is a term of art used to describe an adjusting member for bicycle bearings, although not always having a conically shaped portion.

The object of the present invention is to provide a Derailleur block of improved construction which avoids the disadvantages just mentioned.

According to the present invention a Derailleur block comprising sleeve-like means adapted to be secured to a part to be driven, a sprocket carrier, bearing means supporting said sprocket carrier for rotation on said sleeve-like means, a free-wheeling mechanism between said sleeve-like means and said sprocket carrier, and a plurality of sprockets secured as a removable assembly to said sprocket carrier for rotation therewith, is characterised by a cone adjustably engaged with said sprocket carrier, adapted for setting the clearance of said bearing means, and locking means for, and associated with, said cone, both said cone and said locking means being accessible for manipulation externally of the block. The cone may conveniently partially define a bearing race.

Preferably said cone is in screw-threaded adjustable engagement with said sprocket carrier, and said locking means is a lock nut in screw-threaded engagement with said cone. When in operative position said lock nut may conveniently function also as a supporting abutment for the assembly of sprockets.

The invention will now be described further, by way of example only, with reference to the accompanying drawings illustrating one embodiment thereof and in which:

FIG. 1 is an elevation in section through a Derailleur block constructed in accordance with the invention, and FIG. 2 is a similar view of an alternative component suitable for use in the block of FIG. 1.

Referring now to the drawings a Derailleur block comprises a sleeve 11 screw-threadedly secured to a bicycle wheel hub 12, a sprocket carrier 13 rotatably supported on the sleeve 11, a free-wheel mechanism 14 interposed between the sleeve 11 and carrier 13, and a plurality of sprockets having different numbers of teeth mounted on the sprocket carrier 13.

The outer peripheral surface of the sleeve 11 is of stepped configuration, a larger diameter central portion 11a being provided with pockets to receive pawls forming part of the free-wheel mechanism 14.

At either side of the central portion 11a the peripheral surface of the sleeve is shaped to define the inner parts of the races of two ball-bearing arrangements 16,19 the outer part of the race of the outboard ball-bearing arrangement 19 being constituted by a surface 13a on the sprocket carrier 13 and the outer part of the race of the inboard arrangement 16 being defined by a cone 17 screw-threadedly engaged with the end of the carrier 13 and having a suitably shaped bearing surface 17a.

At its inner peripheral surface, the sprocket carrier 13, in addition to presenting the bearing surface 13a, presents ratchet teeth 14a in radial register with the pawls and for engagement thereby.

The outer peripheral surface of the carrier 13 is stepped, an inboard larger diameter portion 13b having three splines 13c angularly spaced thereabout for a purpose hereafter to be described and an inboard, smaller diameter portion 13d being externally screw-threaded. A shoulder 13e is provided between the inboard and outboard portions.

The sprockets 15 are supported on the sprocket carrier 13, three such sprockets 15a, with spacers 15a' therebetween, being arranged in axially spaced relationship on the larger diameter portion 13b of the carrier 13, and the carrier 13, and the remaining two sprockets 15b, whether as two individual sprockets as shown in FIG. 1 of the drawing or as parts of a single component (FIG. 2) present two sets of gear teeth arranged in axially spaced relationship being secured by screw threaded engagement on the smaller diameter portion 13d for rotation together with the carrier 13. The inboard sprocket 15b is formed with an axial flange 15b' and thereby holds the extreme outboard sprocket 15a on the larger diameter portion 13b of the carrier 13 in spaced axial relationship thereto. Alternatively, a spacer seated on the shoulder could be provided for a like purpose.

Rotation of the sprockets 15a relative to the carrier 13, is precluded by providing such sprockets with recesses at the inner periphery thereof for engagement with the splines 13c on carrier 13.

The sprockets are located axially of the carrier 13 by a locknut 18 bearing against the end of the sprocket assembly, and extending radially outwardly beyond the periphery of the carrier 13 to define an abutment for the extreme inboard sprocket 15a, the locknut 18 being screw-threadedly engaged with the cone 17 and serving to lock the same against movement after adjustment.

As will readily be appreciated, the ball-race clearances of the free-wheeling mechanism can be set by suitable adjustment of the cone 17 and can be locked in this adjusted condition by means of the locknut 18. Should the need arise for adjustment of the setting this can be effected by releasing the locknut, adjusting the cone as appropriate and then tightening the locknut. There is no need to dismantle the block.

Replacement of the sprockets 15 is possible without disturbing the free-wheeling mechanism simply by removing the outermost sprockets 15b by unscrewing them and then sliding the remaining sprockets 15a from the carrier 13. Replacement sprockets are located against the abutment furnished by the locknut 18 and held in position by the screwed-on sprockets 15b which may also be changed.

What is claimed is:

1. A Derailleur block for a cycle wheel comprising in combination, sleeve-like means adapted to be rigidly secured to the hub of said cycle wheel, outwardly-facing inboard and outboard peripheral formations on said sleeve-like means each defining one part of a ball race, a sprocket carrier, an internal inwardly-facing formation on said carrier complementary to said outboard peripheral formation on said sleeve-like means to complete a ball race, a free-wheeling mechanism between said sleeve-like means and said sprocket carrier, a cone, in screw-threaded adjustable engagement with the interior of said sprocket carrier at the inboard end thereof, a formation on said cone complementary to the said inboard peripheral formation of said sleeve-like means to complete another ball race, balls in said ball races, a lock nut in adjustable screw-threaded engagement with the exterior of said cone and forming an abutment at one end of said carrier, a first sprocket mounted on said carrier in engagement with said abutment, a plurality of intermediate sprockets mounted on said carrier and axially spaced from said first sprocket, and a final sprocket member in screw-threaded engagement with the periphery of said carrier and serving to secure the other sprockets in axial position.

2. A Derailleur block as set forth in claim 1 in which said sprocket carrier has a larger diameter portion at its inboard end, said larger diameter portion being splined, and a smaller diameter portion at its outboard end, said smaller diameter portion being externally screw-threaded, at least some of said sprockets being internally grooved for engagement with said splined larger diameter portion, and said final sprocket member being internally screw-threaded for engagement with said externally screw-threaded smaller diameter portion.

3. A Derailleur block as set forth in claim 1 in which said final sprocket member has two sprocket formations thereon.

* * * * *